(12) United States Patent
Lloyd

(10) Patent No.: US 10,391,617 B1
(45) Date of Patent: Aug. 27, 2019

(54) CANOPY REMOVAL AND STORAGE SYSTEMS AND METHODS

(71) Applicant: Mark Lloyd, Sedro Woolley, WA (US)

(72) Inventor: Mark Lloyd, Sedro Woolley, WA (US)

( * ) Notice: Subject to any disclaimer, the term of this patent is extended or adjusted under 35 U.S.C. 154(b) by 230 days.

(21) Appl. No.: 15/063,322

(22) Filed: Mar. 7, 2016

Related U.S. Application Data

(60) Provisional application No. 62/128,941, filed on Mar. 5, 2015.

(51) Int. Cl.
*B25B 27/00* (2006.01)
*B60J 7/10* (2006.01)
*B66F 11/00* (2006.01)

(52) U.S. Cl.
CPC .......... *B25B 27/0035* (2013.01); *B60J 7/106* (2013.01); *B66F 11/00* (2013.01)

(58) Field of Classification Search
CPC ... B60J 7/061; B60J 7/062; B60J 7/106; B60J 7/102; B66C 23/48; B66C 23/44; B66C 23/36; B25B 27/0035; A61G 7/1019; B60P 1/6445; E04F 21/1822
USPC ............ 254/338, 47, 89 R, 8 B; 414/11, 458
See application file for complete search history.

(56) References Cited

U.S. PATENT DOCUMENTS

| | | | | |
|---|---|---|---|---|
| 1,259,942 A | * | 3/1918 | Weaver | B66D 3/04 212/345 |
| 1,520,630 A | * | 12/1924 | Bateman | B62B 5/0083 280/43.1 |
| 2,815,132 A | * | 12/1957 | Stone | B62B 3/04 182/141 |
| 3,887,209 A | * | 6/1975 | Blanc | B65D 90/18 280/43.21 |
| 3,907,254 A | * | 9/1975 | Richards | B66F 15/00 254/131 |

(Continued)

FOREIGN PATENT DOCUMENTS

| CA | 1296371 C | 2/1992 |
|---|---|---|
| CA | 2033468 A1 | 7/1992 |

(Continued)

OTHER PUBLICATIONS

DETAILK2, Back Flip Headache Rack and Flip Rack, http//www.pickupspecialties.com/ladder_racks_main.htm, (retrieved Sep. 2014 & Mar. 2016), 7 pages.

(Continued)

*Primary Examiner* — Sean K. Hunter
*Assistant Examiner* — Seahee Yoon
(74) *Attorney, Agent, or Firm* — Michael R. Schacht; Schacht Law Office, Inc.

(57) ABSTRACT

The disclosed canopy caddy utilizes a pair of wheeled lifting and rotating mechanisms. The canopy caddy allows a person to remove a canopy from a truck bed, rotate it to a vertical position, and roll it to another location such as for storage. In one example, the user can accomplish these tasks alone or with minimal assistance and little danger of damage to the canopy. The term canopy used herein is intended to encompass but not be limited to small open box covers having lateral outward edges which rest upon the upper edges of a truck bed and provide additional covered storage. The term canopy used in this disclosure is intended to also encompass those apparatuses known as tonneau covers as well as some camper tops.

6 Claims, 15 Drawing Sheets

(56) References Cited

U.S. PATENT DOCUMENTS

| | | | | |
|---|---|---|---|---|
| 4,063,762 | A | 12/1977 | Williams | |
| 4,231,709 | A * | 11/1980 | Corsetti | B60P 1/6445 280/404 |
| 4,239,197 | A * | 12/1980 | Olstad | B23Q 1/525 269/152 |
| 4,452,555 | A * | 6/1984 | Calabro | B60P 1/6445 280/43.23 |
| 4,456,421 | A * | 6/1984 | Robson | B60P 1/4428 414/541 |
| 4,599,034 | A * | 7/1986 | Kennedy | B66F 7/025 254/89 R |
| 4,705,264 | A * | 11/1987 | Hawkins | B66C 23/485 269/17 |
| 4,709,956 | A | 12/1987 | Bowman | |
| 4,756,325 | A | 7/1988 | Daniels | |
| 4,799,726 | A | 1/1989 | Scott | |
| 4,828,315 | A | 5/1989 | Muirhead | |
| 4,903,946 | A * | 2/1990 | Stark | B65D 90/143 254/45 |
| 4,936,733 | A * | 6/1990 | Girerd | B60P 1/6445 414/458 |
| 4,978,132 | A * | 12/1990 | Wilson | B62B 3/108 269/17 |
| 5,531,497 | A | 7/1996 | Cheng | |
| 5,779,255 | A * | 7/1998 | Garcia, Jr. | B66F 3/02 280/404 |
| 5,800,114 | A * | 9/1998 | Secondi | B66F 3/46 280/43.23 |
| 5,984,275 | A * | 11/1999 | Hoslett | B60J 11/00 248/327 |
| 6,000,745 | A | 12/1999 | Alexa | |
| 6,260,218 | B1 * | 7/2001 | Tsuga | A61G 7/1019 5/86.1 |
| 6,471,280 | B1 | 10/2002 | Fowler | |
| 6,830,422 | B2 * | 12/2004 | Whitley | B60P 3/40 414/458 |
| 6,959,918 | B1 * | 11/2005 | Samuels | B60J 7/106 248/327 |
| 6,981,306 | B1 * | 1/2006 | Clouser | B25B 11/00 269/71 |
| 7,008,165 | B1 * | 3/2006 | Grimes | B62B 3/108 269/17 |
| 7,008,166 | B1 * | 3/2006 | Grimes | B66C 23/48 254/114 |
| 7,100,896 | B1 * | 9/2006 | Cox | B66F 3/44 254/92 |
| 7,243,904 | B1 * | 7/2007 | Grimes | B66C 23/48 254/2 B |
| 7,409,750 | B2 * | 8/2008 | Machacek | B29C 70/74 24/30.5 R |
| 7,461,733 | B2 * | 12/2008 | Dohi | B62D 65/18 198/345.1 |
| 9,409,750 | B2 * | 8/2016 | Smith | B60J 7/1607 |
| 2003/0039535 | A1 * | 2/2003 | Gourand | B60P 1/5433 414/543 |
| 2007/0189887 | A1 * | 8/2007 | Lindblom | B60P 1/6409 414/498 |
| 2009/0309079 | A1 * | 12/2009 | Lacina | B60J 7/106 254/47 |
| 2012/0155997 | A1 * | 6/2012 | Pawlak | B60P 1/548 414/373 |
| 2012/0294700 | A1 * | 11/2012 | Ervin | B66C 23/44 414/550 |

FOREIGN PATENT DOCUMENTS

| | | | |
|---|---|---|---|
| CA | 2742997 | A1 | 8/2014 |
| WO | 1991009751 | A1 | 7/1991 |
| WO | 1998010955 | A1 | 3/1998 |

OTHER PUBLICATIONS

Duratray Transport Equipment, Soft Canopies & Frames, http://www.duratray.net.au/index.php/accessories-soft-canopies-and-frames, 2014, (retrieved Sep. 2014 & Mar. 2016), 3 pages.

Fastkap, Retractable Canopy, http://www.fastkap.com/, 1998, (retrieved Sep. 2014 & Mar. 2016), 1 page.

K8 Bailey Patrick, Canopy Removal & Storage, http://www.k8baily.com/2013/06/07/canopy-removal-storage/, Jun. 7, 2013, (retrieved Sep. 2014 & Mar. 2016), 4 pages.

The "Clamper", http://www.theclamper.com/, (retrieved Sep. 2014 & Mar. 2016), 2 pages.

* cited by examiner

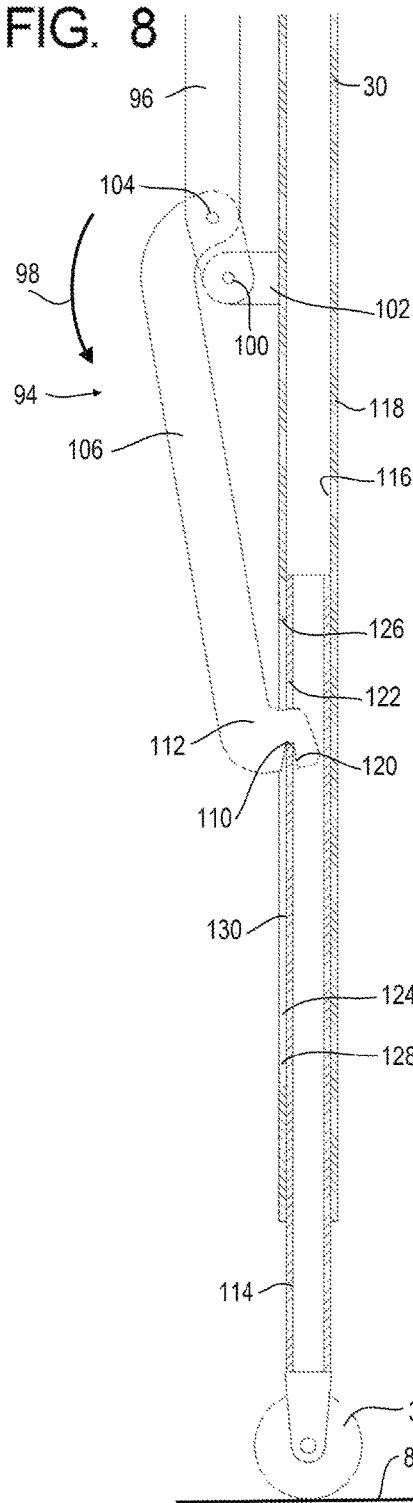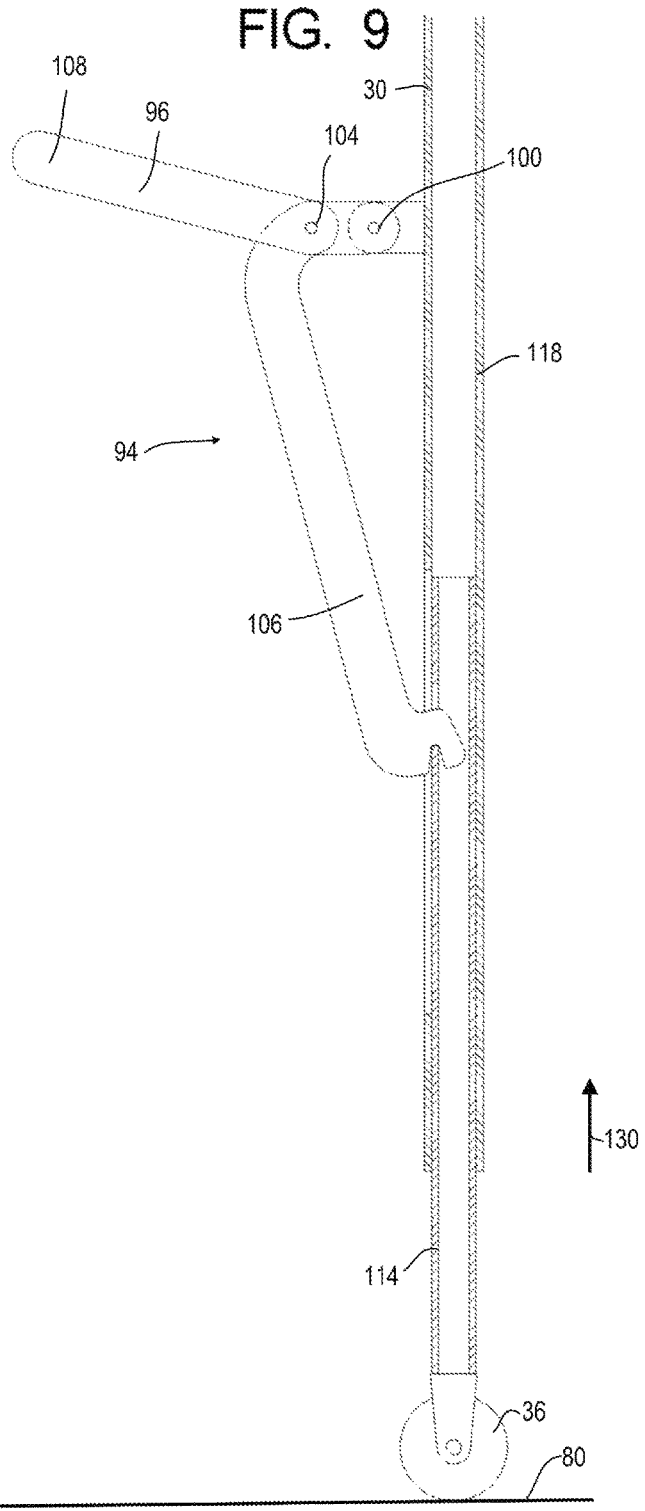

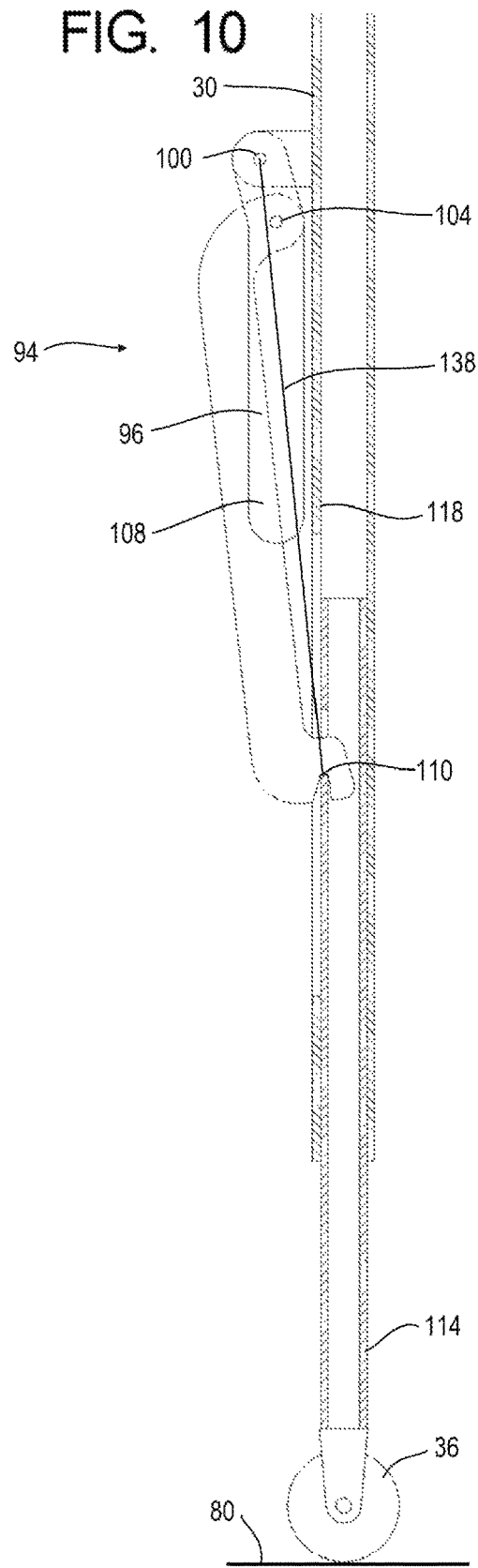

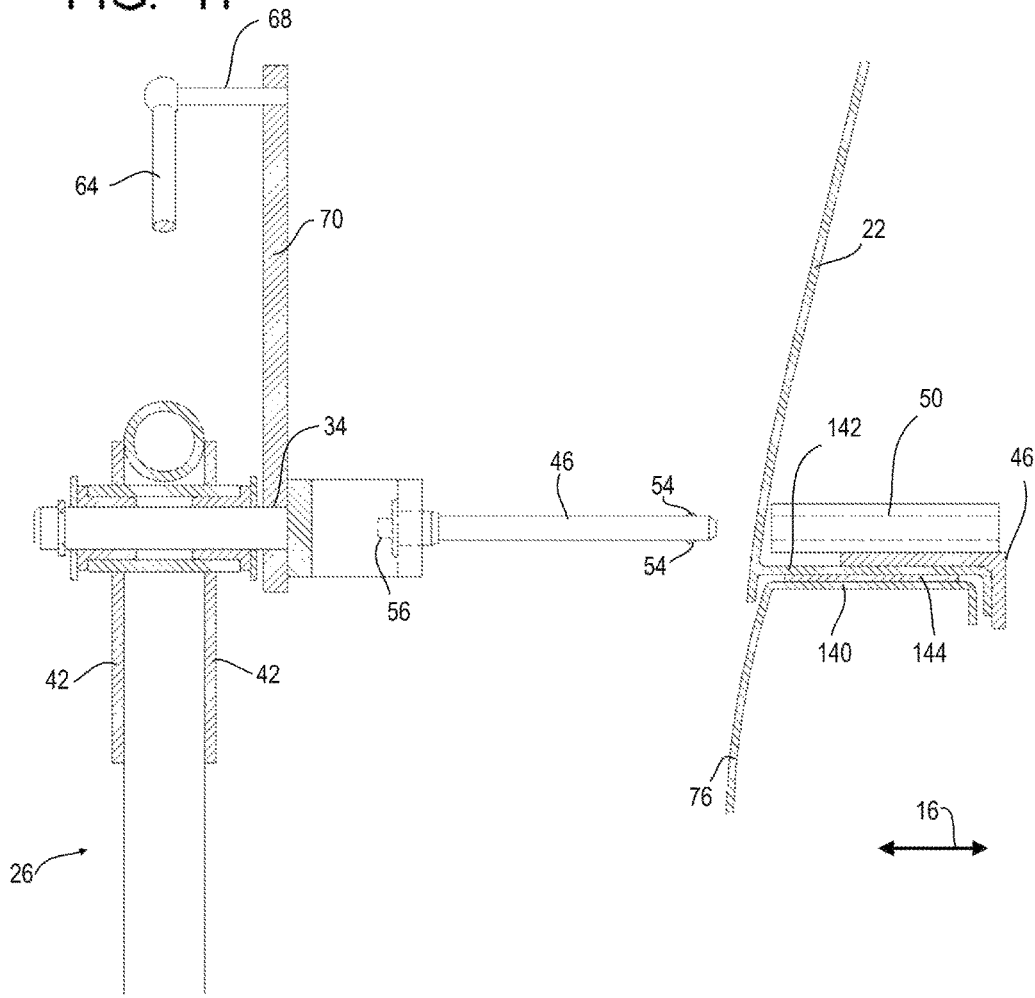

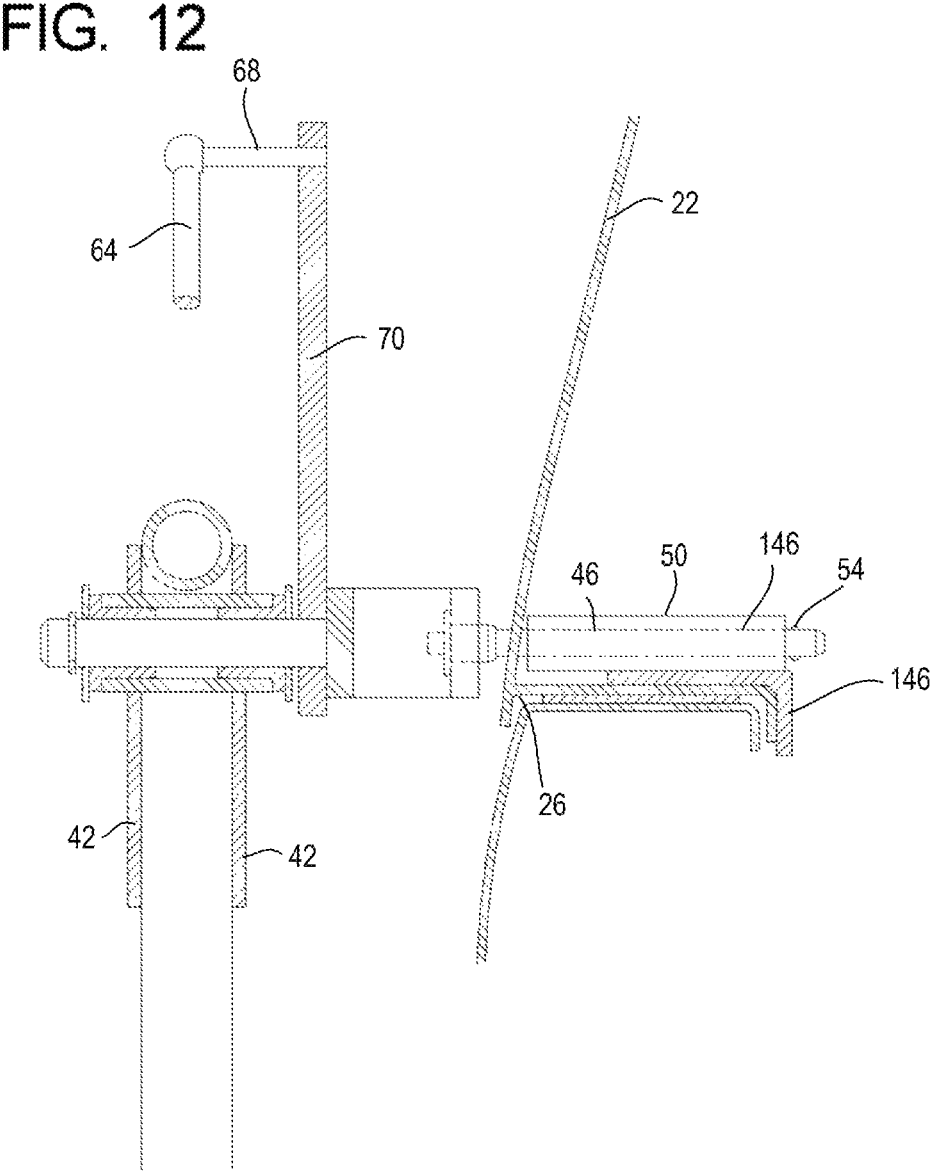

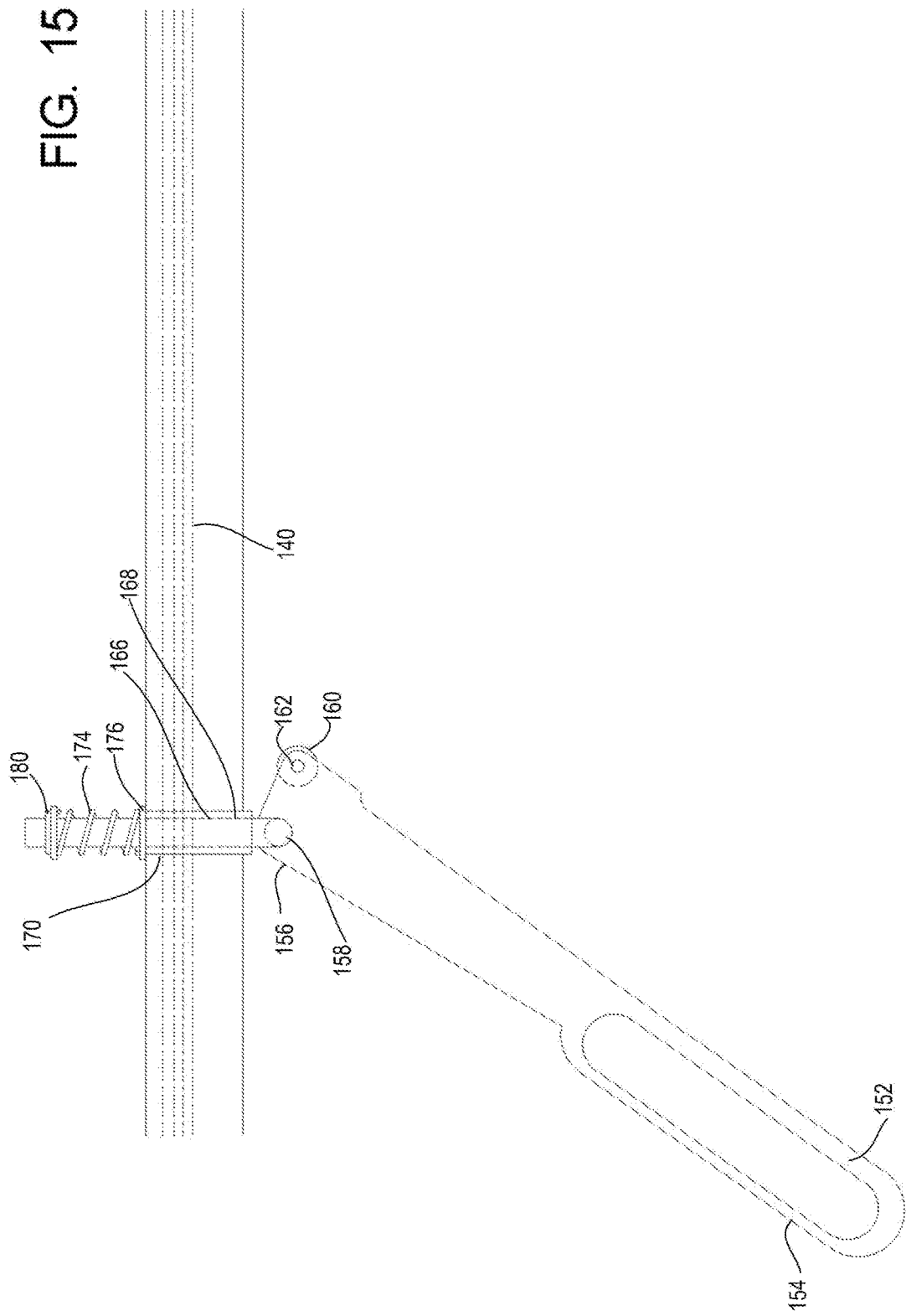

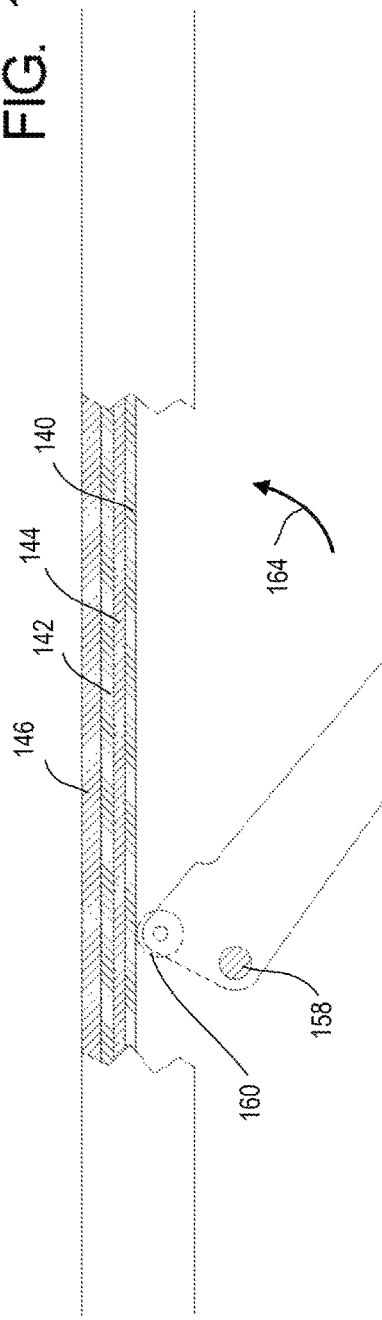
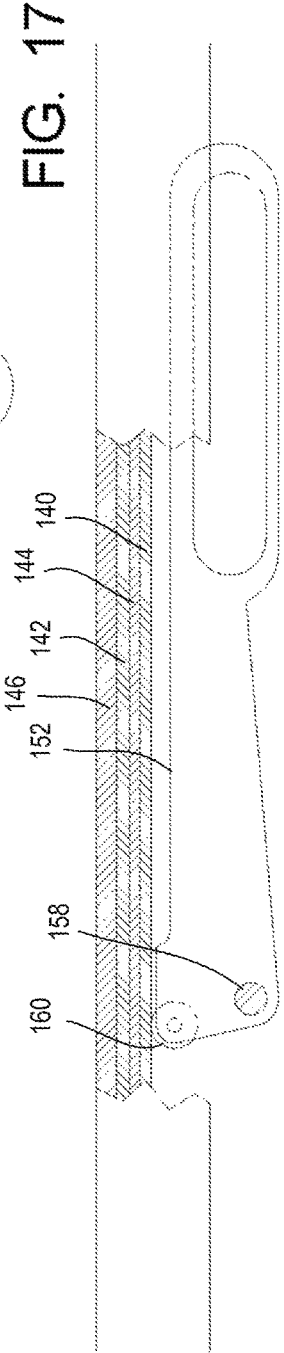

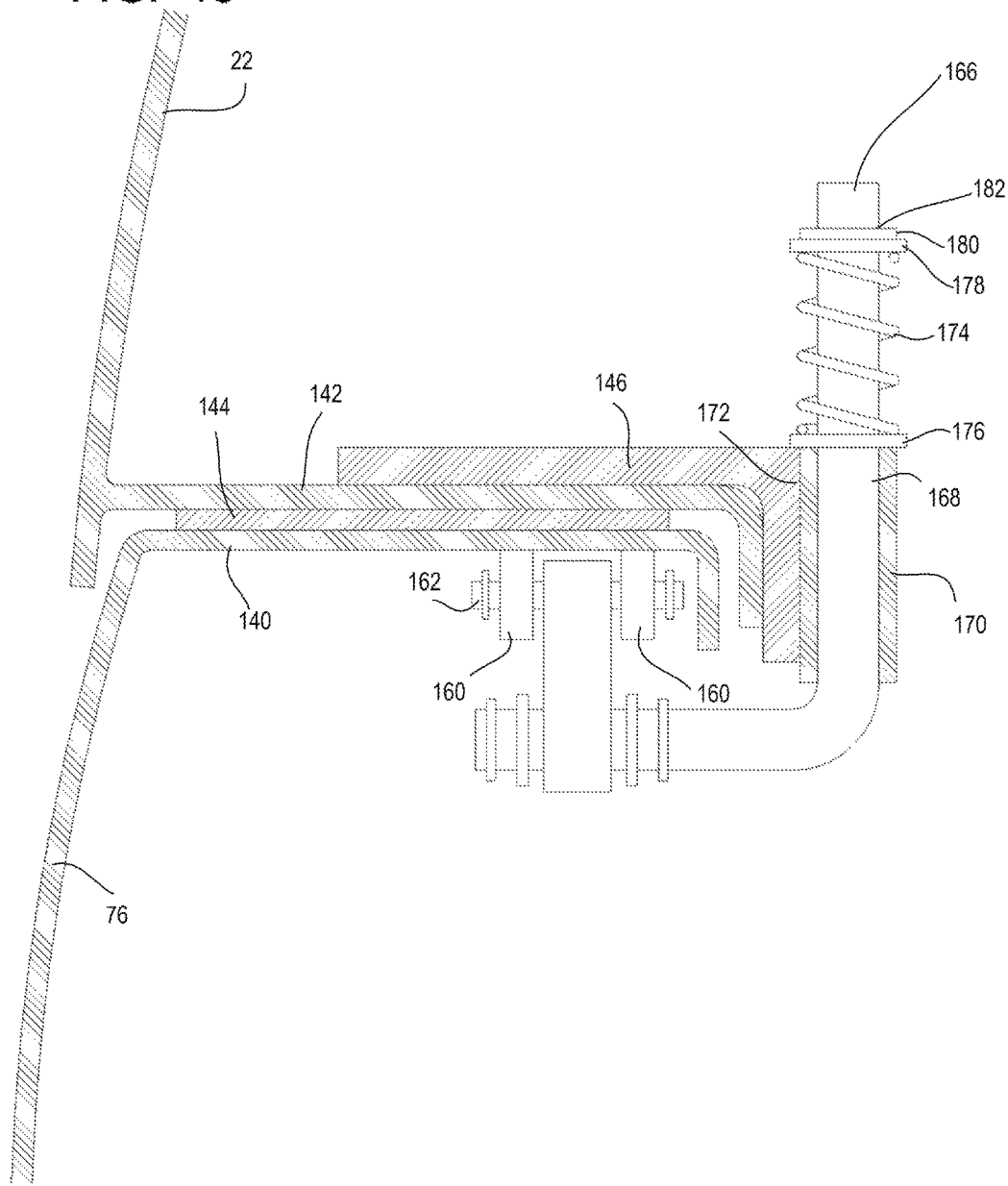

CANOPY REMOVAL AND STORAGE SYSTEMS AND METHODS

RELATED APPLICATIONS

This application, U.S. patent application Ser. No. 15/063,322 filed Mar. 7, 2016, claims benefit of U.S. Provisional Application Ser. No. 62/128,941 filed Mar. 5, 2015, the contents of which are incorporated herein by reference.

BACKGROUND OF THE DISCLOSURE

Field of the Disclosure

This disclosure relates to the field of apparatuses to raise and remove canopies from a truck bed and install them thereupon.

SUMMARY

Disclosed herein are examples of a canopy caddy for easy removal and installation of a truck canopy, tonneau cover, or similar apparatus.

The canopy caddy in one example is used for removing and installing a canopy to a truck bed. The canopy caddy in one example comprising left and right side wheeled mechanisms independently and removably attached to the canopy. Each wheeled mechanism comprising in turn; at least one height adjustable leg having a top end and a bottom end; the top end of each leg attached to a canopy pivot having a lateral axis of rotation; and the canopy pivot removably attached to the canopy. The canopy pivot of this example is configured to support the canopy above the truck bed; the left and right side wheeled mechanisms are configured to cooperatively lift the canopy off the truck bed; and the canopy pivot of each of the left and right side wheeled mechanisms is configured to cooperatively rotate the canopy from a horizontal position to a vertical position.

The canopy caddy as disclosed may be arranged wherein each wheeled mechanism further comprises at least one lifting mechanism.

The canopy caddy as disclosed may further comprise a quick release mechanism removably securing the canopy to the truck bed without tools.

The canopy caddy as disclosed may be arranged wherein the lifting mechanism further comprises: a cam arm having an armature pivot with a lateral axis of rotation; and the cam arm having a horizontally aligned tang pivot with a lateral axis of rotation; and the cam arm is configured to lift the canopy in a vertical plane away from a truck bed top rail when the canopy is removed from the truck bed and toward from a truck bed top rail when the canopy is installed upon the truck bed.

BRIEF DESCRIPTION OF THE DRAWINGS

FIG. 8 is a cutaway side enlarged view of the locking armature in a first position.

FIG. 9 is a cutaway side enlarged view of the locking armature in a second position.

FIG. 10 is a cutaway side enlarged view of the locking armature in a third position.

FIG. 11 is an enlarged rear cutaway view of the canopy caddy and canopy showing the canopy caddy aligned to be attached to the canopy taken along line 11-11 of FIG. 7.

FIG. 12 is an enlarged rear cutaway view of the canopy caddy and canopy showing the canopy caddy attached to the canopy.

FIG. 15 is a hidden line partial cutaway view of an attachment system between the canopy and the truck bed cap in a first position.

FIG. 16 is a hidden line partial cutaway view of an attachment system between the canopy and the truck bed cap in a second position.

FIG. 17 is a hidden line partial cutaway view of an attachment system between the canopy and the truck bed cap in a third position.

FIG. 18 is a rear partial cutaway view of an attachment system between the canopy and the truck bed cap.

DESCRIPTION OF THE PREFERRED EMBODIMENTS

The disclosed device allows a person to remove a canopy from a truck bed, rotate it to a vertical position, and roll it to another location such as for storage. In one example, the user can accomplish these tasks alone or with minimal assistance and little danger of damage to the canopy. The term canopy used herein is intended to encompass but not be limited to small open box covers having lateral outward edges which rest upon the upper edges of a truck bed and provide additional covered storage to the truck bed. The term canopy used in this disclosure is intended to also encompass those apparatuses known as tonneau covers as well as some camper tops.

The term truck used herein to describe pickup trucks including various forms of vehicle for carrying goods and materials. Trucks usually consist of a single self-propelled vehicle with an open bed on the rearward portion thereof. To abbreviate this disclosure, the term "truck" will be used as a general term to encompass all of such vehicles. The apparatus may also be utilized to remove storage containers from other vehicles such as for example boxes commonly attached to small passenger vehicles for the storage of luggage, or athletic equipment such as skis.

Several prior art systems designed to accomplish the same operation utilize ropes or similar tension members extending downward from a support structure (such as a ceiling) vertically above the canopy. A user would extend these ropes and attach them such as to the four lateral and longitudinal corners of the canopy. A user would then use a pulley system, winch, or similar device to raise the canopy off of the truck bed for storage or removal. This sort of system requires additional structure (gantry) to horizontally remove the canopy to a storage location if it is undesired to leave the canopy in a raised position above the floor supported only by the ropes.

What has been desired and attempted in many different variations is a device which allows for a single person with little assistance if any to remove, install, and store a canopy. Such a device and system are disclosed herein including an innovation which allows for vertical rotation and horizontal repositioning of the canopy while attached to the lift mechanism. The added innovation of an apparatus which allows for vertical rotation about a lateral axis of the canopy substantially reduces the storage area required for the apparatus.

Figure 1:
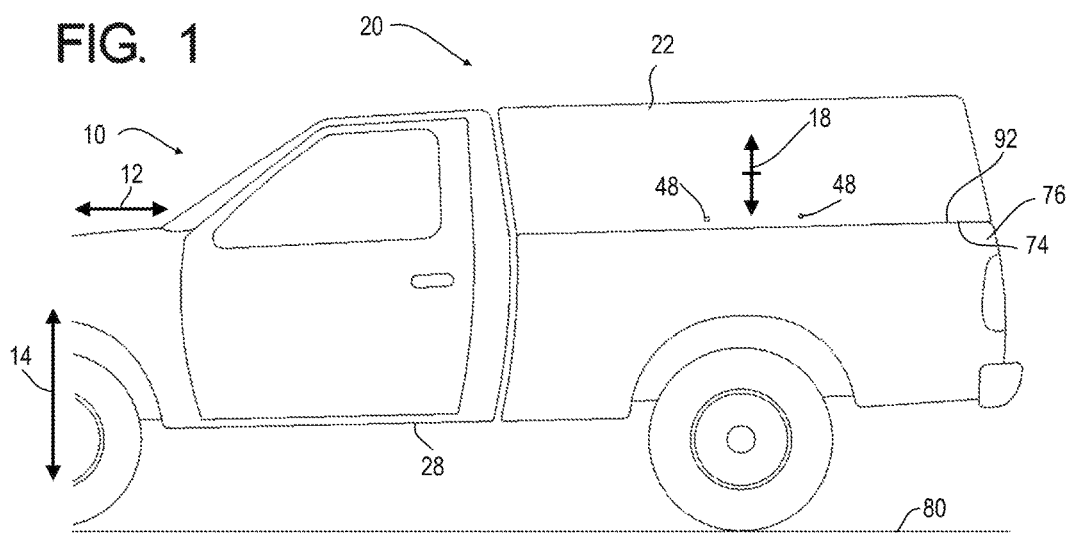
FIG. 1 is a side view of a truck with a modified canopy thereupon with the canopy ready to receive the disclosed canopy caddy.

Before continuing a detailed description, and axes system 10 will be described to be utilized in this disclosure to described relative directions. The axes system 10 including a longitudinal axis 12 is generally in-line between the forward end of the canopy in the position shown in FIG. 1. Axes system 10 also includes a vertical axis 14 aligned orthogonal to the longitudinal axis 12. FIG. 11 also shows a lateral axis 16 aligned orthogonal to both of the longitudinal axis 12 and vertical axis 14. Returning to FIG. 1, a longitudinal center of balance 18 of the canopy is shown. This longitudinal center of balance 18 forms a balance point between the forward end of the canopy and the rear end of the canopy in a horizontal position. Generally, the forward end of the canopy has more weight than the rearward end and therefore the longitudinal center of balance 18 may not be at the longitudinal median between the forward end and the rearward end of the canopy.

As the figures generally show the left or driver's side of the apparatus, it is to be understood that a mirror image of this side of the system may be provided on the right or passenger side to cooperate with the components shown for the system to function as intended. Generally, all components and actions disclosed on the left side of the apparatus will be duplicated on the right side of the apparatus during operation. By providing the canopy caddy 20 in left and right removable assemblies, storage of the apparatus is substantially reduced compared to a unitary overhead lifting structure. In addition, by providing the canopy caddy 20 in left and right removable assemblies, the apparatus may be stored within the canopy while the canopy is attached to the truck.

Figure 7:
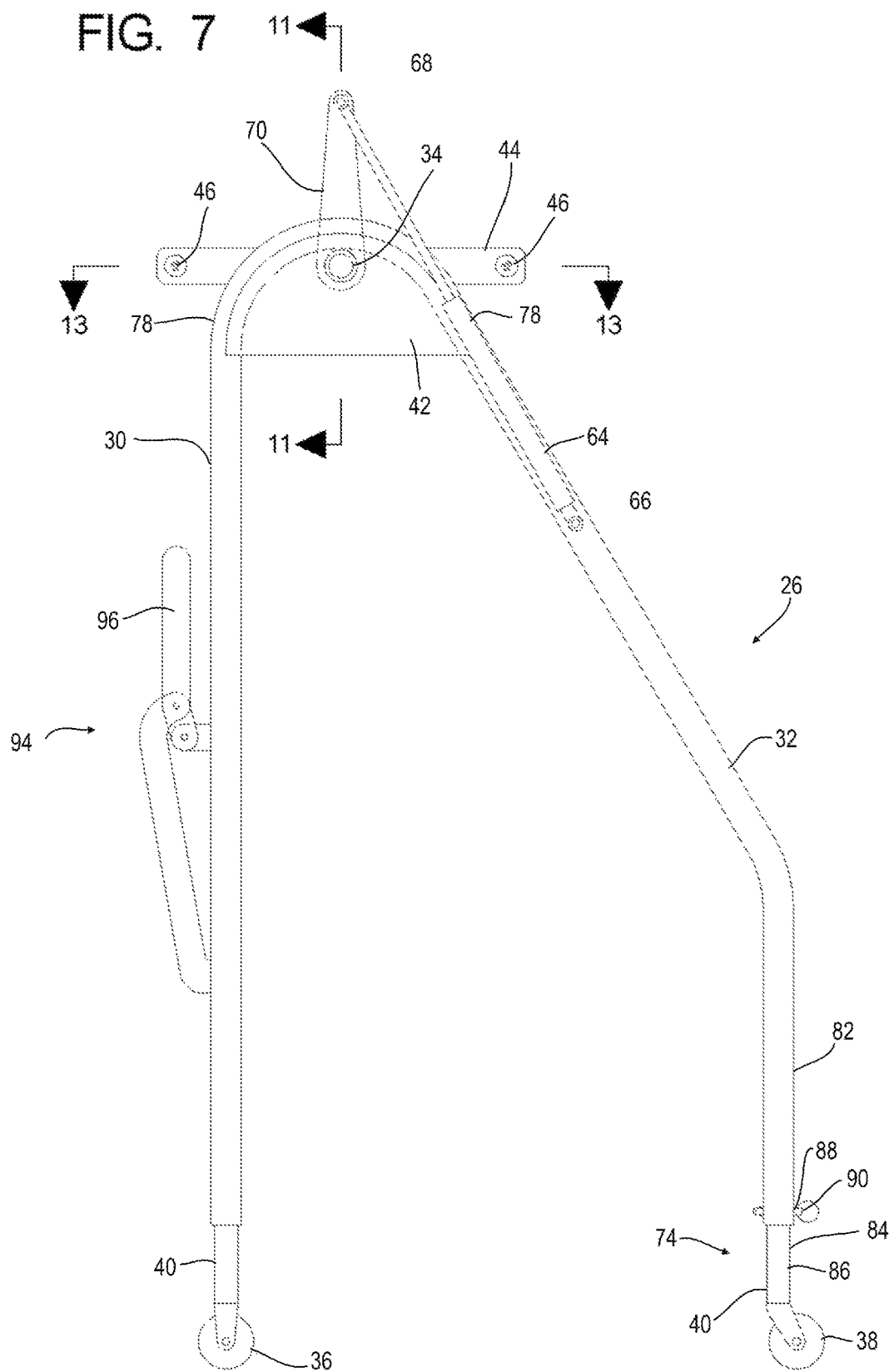
FIG. 7 is a partial hidden line side view of the canopy caddy.

Looking to FIG. 7, one example of the wheeled lift mechanism 26 is shown without the canopy 22 nor truck 28. This example allows for easier viewing of the general components of the wheeled lift mechanism. As can be seen, the wheeled lift mechanism of this example consists of a forward leg 30 and a rearward leg 32 with a (horizontally aligned) canopy pivot 34 provided vertically above and longitudinally between the lowermost ends of the forward leg 30 and rearward leg 32. As the longitudinal center of balance 18 of the canopy will be attached substantially longitudinally at the canopy pivot 34 the overall weight of the assembly will be vertically at this location centered between the forward casters 36 (wheels) and rearward casters 38. This arrangement will substantially prohibit tipping of the apparatus during movement. In one example, the forward casters 36 and/or the rearward casters 38 may be provided as swivel casters allowed to rotate through a vertical axis so as to more easily manipulate the canopy caddy 20 with the canopy there attached. As can be seen, the casters 36 and 38 are attached at a lower end 40 of the legs 30 and 32. In this example, a reinforcement plate 42 is attached at the upper end 78 of the forward leg 30 and rearward leg 32 to provide additional reinforcement for the canopy pivot 34. The reinforcement plate 42 may be adhered, cast as a unitary structure with, or welded to the legs 30 and 32. In another example, a single plate may be utilized as the forward leg 30, rearward leg 32 and reinforcement plate 42.

Figure 13:
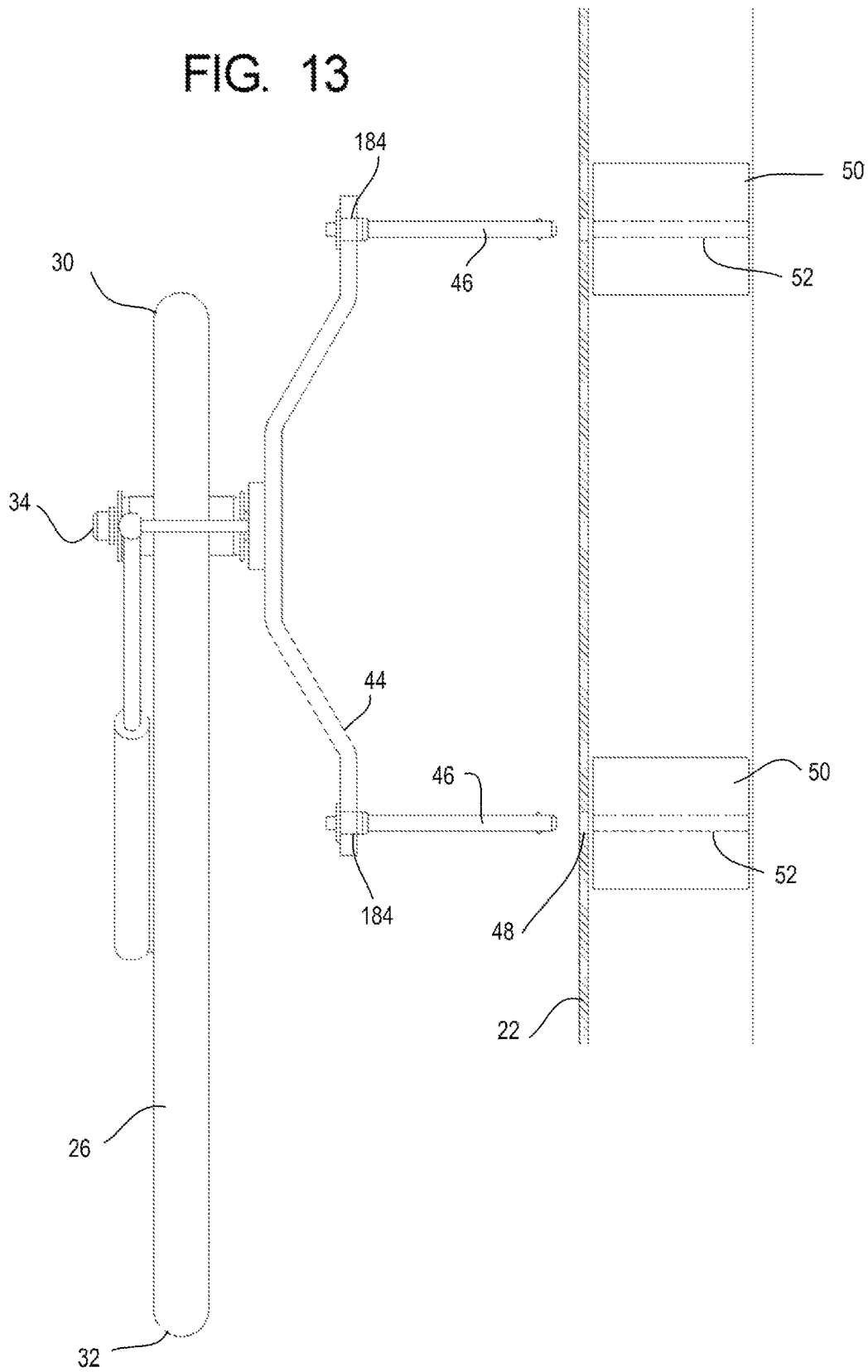
FIG. 13 is an enlarged partial hidden line top cutaway view of the canopy caddy and canopy showing the canopy caddy aligned to be attached to the canopy.
Figure 14:
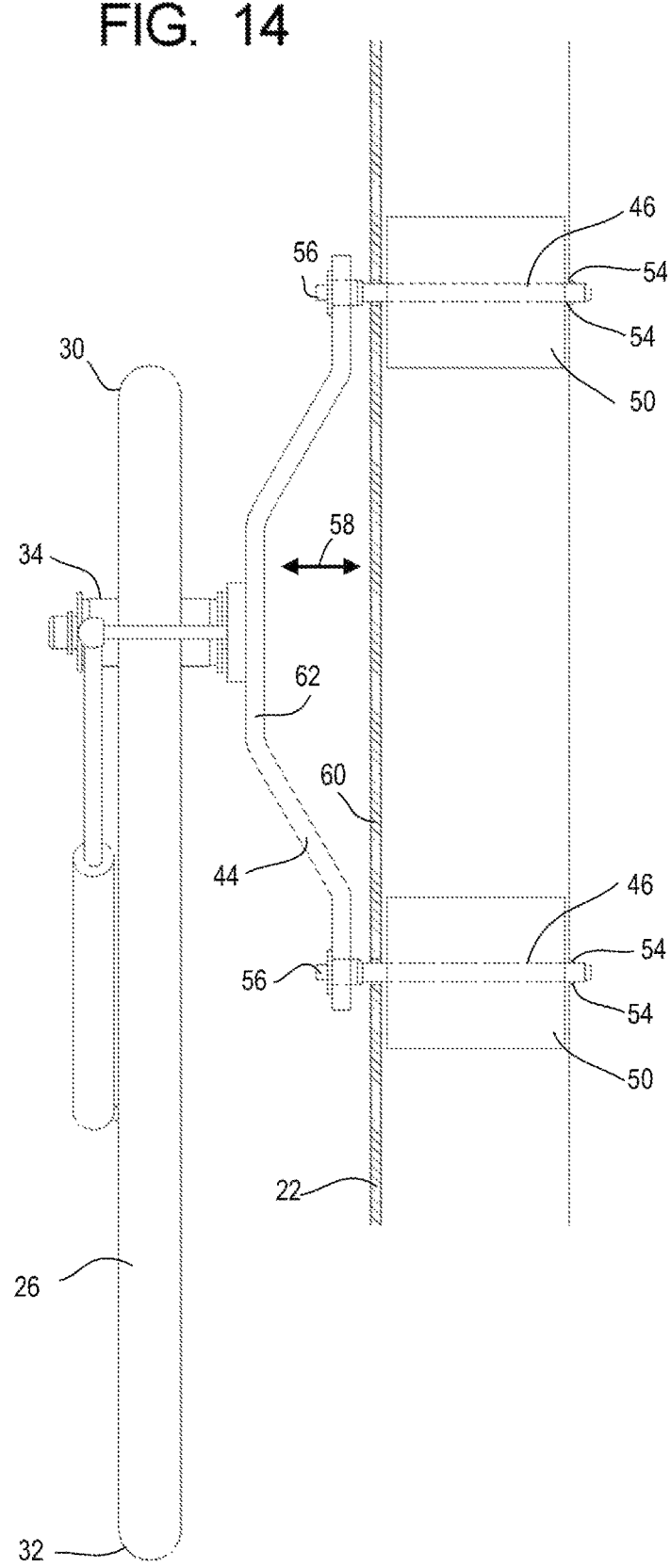
FIG. 14 is an enlarged partial hidden line top cutaway view of the canopy caddy and canopy showing the canopy caddy attached to the canopy.

FIG. 7 also shows a torsion bracket 44 including pins 46 which can be viewed in the top cutaway view of FIG. 13. These pins 46 pass through surfaces defining voids 48 in the canopy 22 for attachment of the wheeled lift mechanism 26 to the canopy 22. In example shown, pin receivers 50 having surfaces defining voids 52 therein are mounted to the canopy in a manner to be described in more detail later. FIG. 14 shows the bracket 44 attached to the canopy 22 such that the pins 46 are fully engaged into pin receivers 50. As can be seen, the style of pins used in this example comprise balls or protruding components 54 which are biased radially outward from the pin 46 by way of an internal spring and a cam mechanism so as to prohibit accidental removal of the pins 46 from the receivers 50. To release these protruding components 54 a user would press a release pin 56 on the lateral outward portion of the pin 46. Other styles of pins including threaded fasteners etc. may alternatively be utilized.

This particular arrangement allows for simultaneous attachment of both the forward and rearward pins 46 to be inserted into pin receivers 50. In this example the pins 46 may be press fit, adhered, welded, or otherwise fastened into surfaces defining voids 184 of the bracket 44.

In another example, the pins 46 are removably fitted into surfaces defining voids 184. In such an example, the wheeled lift mechanisms 26 may be aligned to the canopy 22 and then pins 46 positioned one at a time so as to fasten the wheeled lift mechanism 26 to the canopy 22 for lifting.

FIG. 14 also shows a lateral gap 58 between the outer surface 60 of the canopy 22 and the inner portion 62 of the bracket including the canopy pivot 34. This gap 58 reduces scratching, marking or damage to the canopy 22 during installation, removal, and repositioning.

Returning to FIG. 7, a gas strut 64 is shown having a first end 66 attached to the rearward leg 32 and an upper end 68 attached to a rotary arm 70. The rotary arm 70 is rigidly attached to the pivot 34 and torsion bracket 44 so as to transfer force from the gas strut 64 to the pivot 34. The rotary arm 70 then converts linear force to rotational force rotating the pivot 34 and therefore rotating the bracket 44. Use of this mechanism can be understood by looking to FIG. 5 which shows the vertical center of balance 72 of the canopy 22 and then comparing this to the view of FIG. 6 where it can be understood that the vertical center of balance 72 has rotated longitudinally rearward of the pivot 34. It can also be seen that the vertical center of balance in the position shown in FIG. 6 is still longitudinally positioned vertically above and longitudinally between the casters 36-38 to substantially eliminate tipping of the apparatus when removed from the truck.

Figure 5:
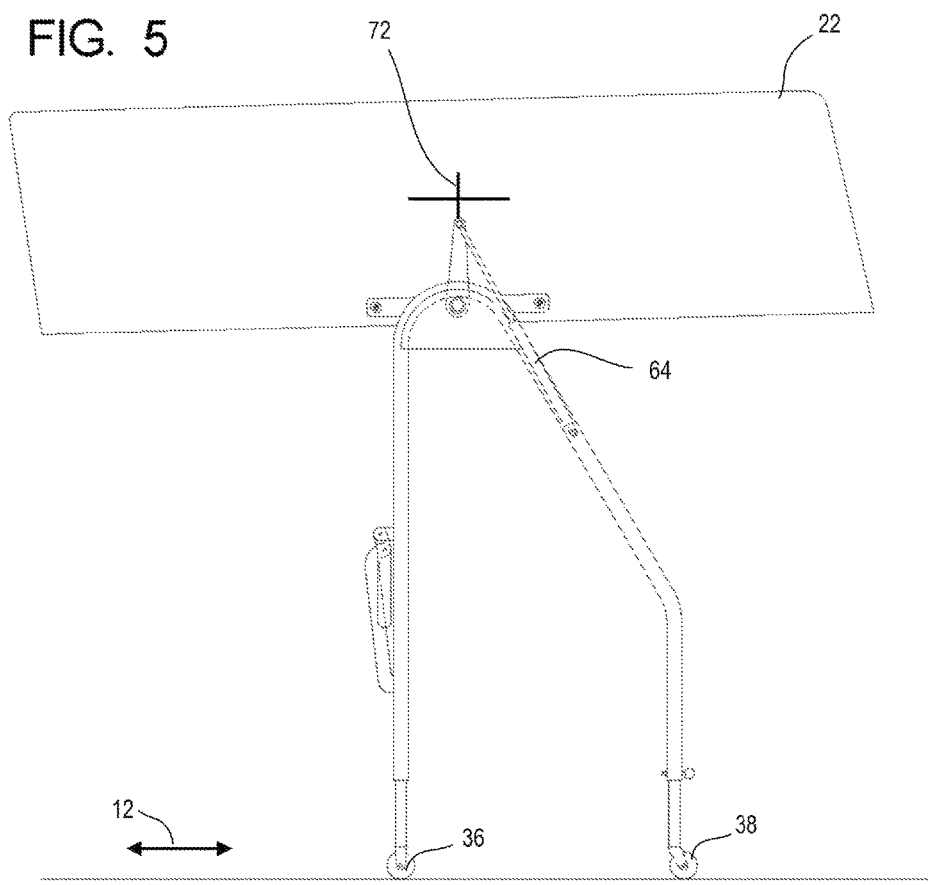
FIG. 5 is a partial hidden line side view of the canopy caddy with the canopy in the horizontal position removed from the truck.
Figure 6:
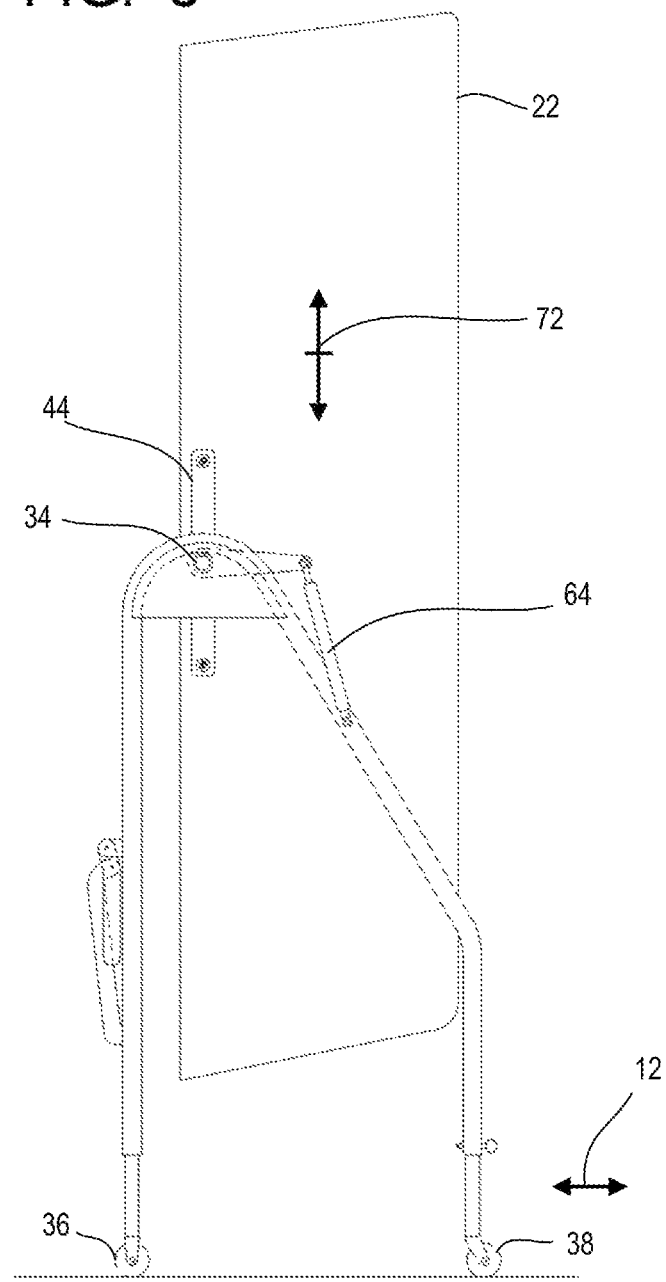
FIG. 6 is a partial hidden line side view of the canopy caddy with the canopy rotated to the vertical position.

During rotation of the canopy from the horizontal position to the vertical position, the compressed gas strut 64 shown in FIG. 6 will store some of the kinetic energy imparted during rotation to the vertical position of FIG. 6 and allow for easier rotation into the position shown in FIG. 5 when it is desired to reinstall the canopy 22 onto the truck 28. It can be understood that a tonneau style cover may require a lighter gas strut, and heavier canopies or camper shells may require heavier gas struts. Comparing these FIGS. 5 and 6, it can also be understood that the longitudinal (12) footprint of the apparatus is substantially reduced from the horizontal or installation position of FIG. 5 to the vertical or storage position shown in FIG. 6.

Still looking to FIG. 7, it may be desired to provide a vertical adjustment system 74 to the rearward leg 32 and/or forward leg 30. For example, the upper edge 74 of the truck bed 76, upon which rests the lower edge 92 of the canopy 22, is not a standard height. Four-wheel-drive vehicles for example commonly have a bed upper edge which is much higher from the road surface 80 than some other trucks. Similarly, trucks with smaller wheels or with less clearance from the road surface to the drive train may have substantially lower upper edges 74 above the road surface 80 than some other trucks. In this example, the rearward leg 32 includes an upper leg 82 into which is fitted a lower leg section 84. The lower leg section 84 having a plurality of surfaces defining pin receiver voids 86 there through. Similarly, the upper leg section 82 having one or more pin receiver voids 88. The lower leg section 84 is then extended out of the upper leg section 82 until the pivot 34 is at the desired height above the road surface 80; then the pin 90 is passed through the surfaces defining voids 86 and 88 to engage the wheeled lift mechanism(s) 26 to the canopy 22. The pin 90 of this example being relatively simple, although other forms of pins, bolts etc. may be utilized. The adjustment system 74 shown in relation to the rearward leg 32 may be duplicated on the forward leg 30.

Figure 2:
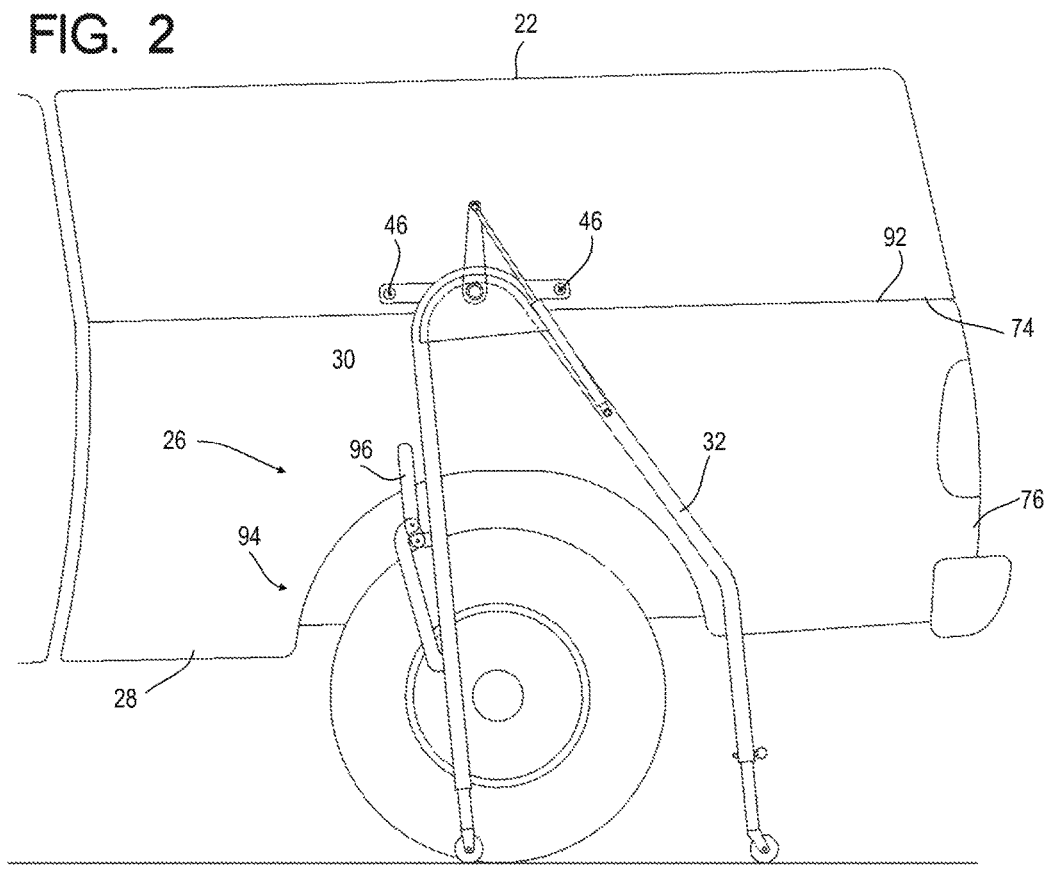
FIG. 2 is a side view of the canopy caddy attached to the canopy.
Figure 3:
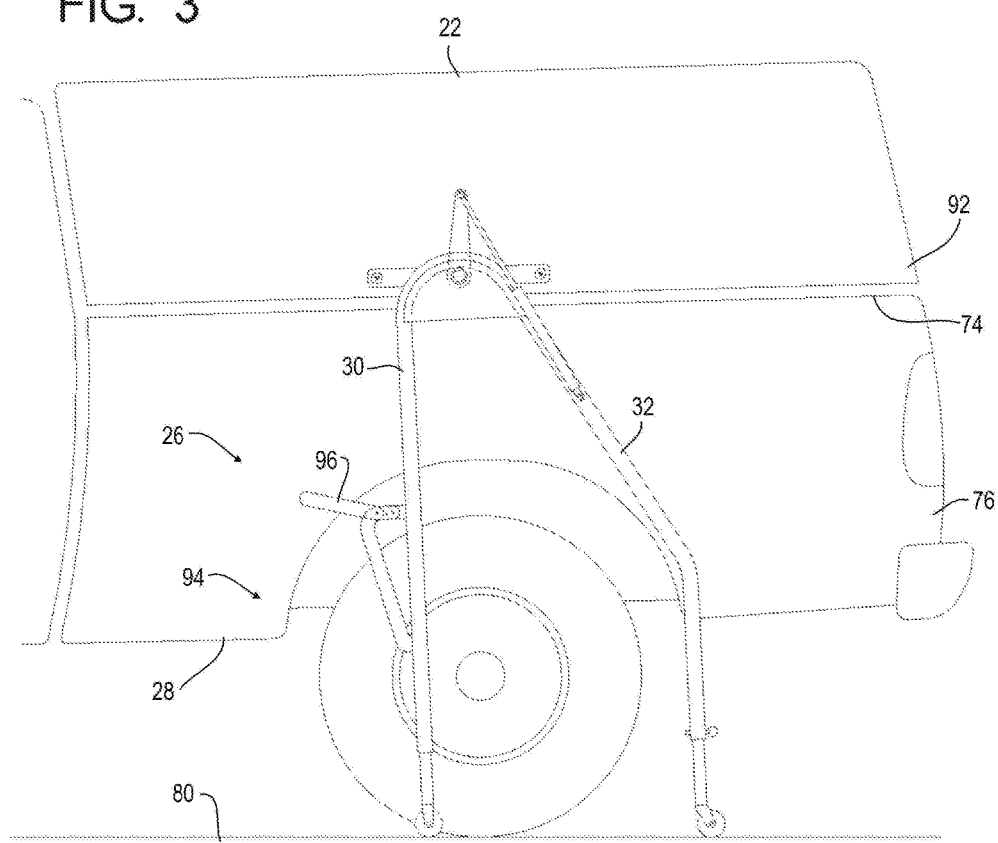
FIG. 3 is a partial hidden line side view of the canopy caddy attached to the canopy and having raised the canopy vertically above the truck bed.
Figure 4:
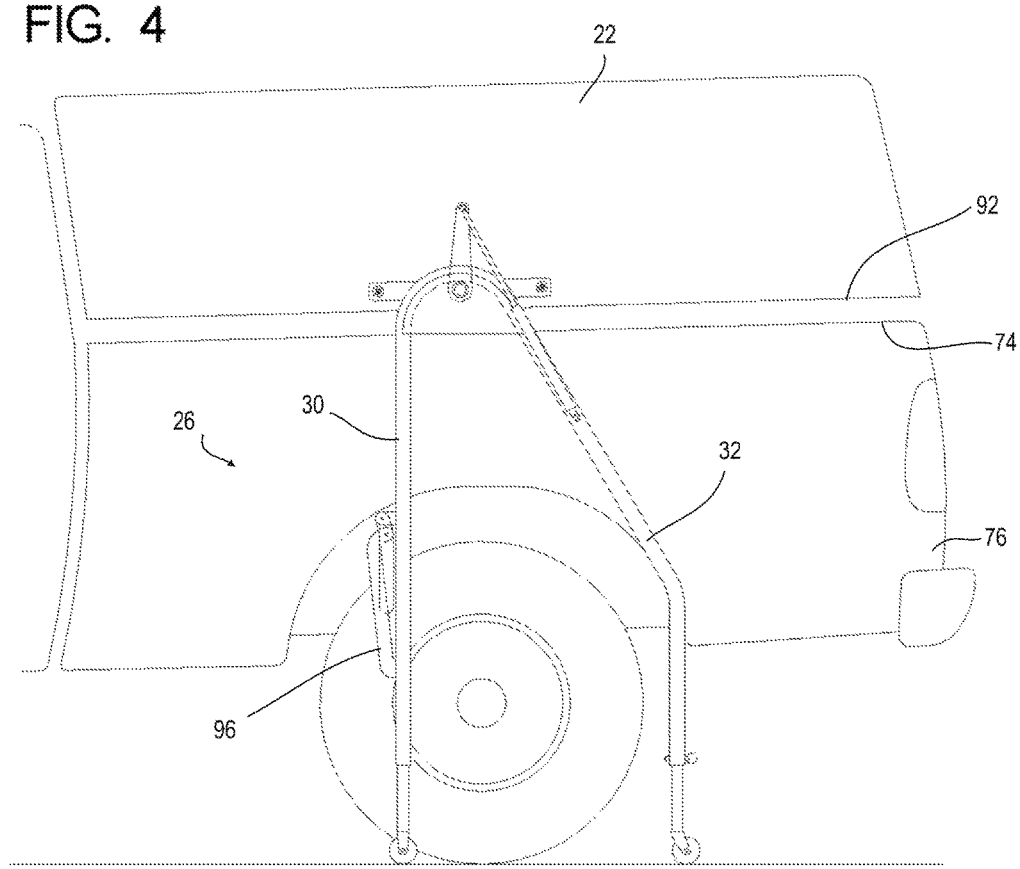
FIG. 4 is a partial hidden line side view of the canopy caddy with the canopy in a raised and locked position.

Looking to FIG. 2 it can be seen an example wherein the wheel lift mechanisms 26 have been placed in position adjacent the canopy 22 and the pins 46 have been inserted through voids 48 into pin receivers 50 as previously described. In this position, the lower edge 92 of the canopy is still in contact with the upper edge 74 of the truck bed. It can also be seen that the lifting mechanism 94 has not been repositioned to raise the canopy 22 off of the truck bed 76 and is still in a lowered position. It can be seen that the handle 96 of the lifting mechanism 94 is in an upward pointing position. Actuation of this lifting mechanism 94 will be described in more detail. Looking to FIG. 3, the same apparatus is shown. However; a separation or gap can clearly be seen between the lower edge 92 of the canopy 22 and the upper edge 74 of the truck bed 76. It can also be seen that the lifting handle 96 has been repositioned forward and downward. Actuation of this lifting mechanism 94 will be described in more detail. Looking to FIG. 4 it can be seen that the canopy 22 has been lifted clear of the truck bed 76 and the gap between the lower surface 92 of the canopy 22 and the upper surface 74 of the truck bed is substantially wider than that shown in FIG. 3. It can also be seen that the lifting handle 96 has been repositioned further downward. From this position, the canopy caddy 20 and canopy 22 may be rolled clear of the truck 28, or the truck may be driven from under the canopy caddy 20 and canopy 22 to the position shown in FIG. 5.

Once positioned clear of the truck 28, the canopy caddy 20 and canopy 22 may be rotated to the position shown in FIG. 6 and wheeled to a storage location.

In FIGS. 8 through 10, is shown a cutaway view of the forward leg 30 including the lifting mechanism 94. Once the torsion bracket 44 is attached to the canopy 22, the canopy 22 may be raised above the truck bed 76. To accomplish this raising of the canopy 22, a user may reposition the lifting handle 96 from the position shown in FIG. 8 in direction of travel 98 in a pivoting action around a tang pivot 100 between the lower end of the lifting handle 96 and a forward end of a tang 102. The tang 102 is fixed to the forward leg 30. In this example, the lifting handle 96 also has an armature pivot 104 between the lifting handle 96 and a raising armature 106. As the distance between the grasping portion 108 of the lifting handle 96 and the tang pivot 100 is substantially longer than the distance between the tang pivot 100 and the armature pivot 104, a substantial lever arm is formed, allowing a user to more easily lift one side of the canopy 22. Thus, rotational force imparted by the user as they rotate the handle 96 in direction of travel 98 is transferred to compressive force at an engagement point 110 between a lower end 112 of the raising armature 106 and a lower section 114 of the leg 30. In this example, the lower section 114 has an outer surface 130 which fits within and slidably engages the inner surface 116 of an upper section 118 of the leg 30. In this example, the engagement point 110 of the raising armature 106 comprises a channel 120 which engages the lower end of a surface defining a void 122 within the lower section 114 of the leg 30. To allow linear movement of this assembly within the upper section 118 of the leg 30, a surface defining a void 124 having upper edge 126 and lower edge 128 may be provided.

Looking to FIG. 9 it can be seen that the handle 96 has been rotated outward and downward from the position shown in FIG. 8 thus, the raising armature 106 has pressed downward on the lower section 114, thus raising the upper section 118 upwards in direction 136. Continuing on to FIG. 10, the handle 96 has been rotated to its lowermost available position, thus raising the canopy to it fully raised position. Further rotation of the handle 96 being prohibited as the grasping portion 108 has substantially contacted the upper section 118 of the leg 30. In this position, the canopy 22 should be in the fully raised position shown in FIG. 4 whereupon the canopy 22 may be removed horizontally from the truck 28 or alternatively, the truck 28 may be removed from under the canopy.

In FIG. 10 it can be also seen that the armature pivot 104 has been rotated past a top dead center position. This top dead center position defined as rotation of the armature pivot past a line 138 between the tang pivot 100 and the engagement point 110. By rotating the armature pivot to this position the weight of the canopy 22 itself will keep the handle 96 from counter-rotating to the position shown in FIG. 8 as compressive force between the upper section 118 and lower section 114 of the leg 30 will bias the handle 96 toward the upper section 118 where it is prohibited from further rotation by contact there against. Such a top dead center locking mechanism provides a safe and secure locking mechanism without additional structure required.

Looking to FIG. 11 is shown a rear, cross sectional view showing the sidewall of the truck bed 76 having a top rail 140 at the top edge thereof. Generally, positioned between this top rail 140 and a bottom rail 142 of the canopy 22 is disposed a malleable member 144. Thin layers of closed cell foam, rubber, silicone etc. are commonly used for this malleable member 144 to provide a non-rigid seal and protective barrier between these two components. As the support member 142 and the overall canopy 22 are normally not designed to be lifted nor rotated in the manner disclosed herein; it may be desired to add a reinforcement or stiffener rail 146 to the bottom rail 142 or other portions of the canopy 22. The reinforcement rail 146 may be an extruded piece of angle aluminum or other metal or material adhered or otherwise attached to the bottom rail 142 or other portions of the canopy 22. As can be seen in this example, the pin receivers 150 are attached by way of fasteners, adhesive, welding or other methods to the stiffener 146.

Looking to FIG. 15 is shown a quick release mechanism for attaching a canopy to a truck bed which may be used in conjunction with the wheeled lift mechanisms described above to aid in easy removal and secure attachment of the canopy from the truck bed.

Looking to FIG. 15 a cam handle 152 is shown us having a first end 154 configured for grasping and a second end 156 having a cam pivot 158 and a wheel 160 having an axle 162 substantially offset from a line extending from the cam pivot 158 and the grasping portion of the cam handle 152. This provides a cam action as will be described. In the position shown in FIG. 15 the wheel 160 is fully clear of the truck bed top rail 140 and is free to rotate about the cam pivot 158 in either direction. Looking to FIG. 16, the cam handle 152 has been rotated in direction 164 until the wheel 160 has contacted the truck bed top rail 140. Continued rotation of the cam handle 152 will reposition the angle bar 166 downward through a surface defining a void 168 in the bracket 170. In one form, the bracket 170 is welded 172 or otherwise fastened to the stiffener rail 146 as can be clearly seen in FIG. 18. As the cam handle 152 shown in FIG. 16 is continued to rotate, the wheel 160 will roll along the underside of the truck bed top rail 140 as the angle bar 166 repositions through the surface defining a void 168 and in one form comprising a compression spring 174 between a washer 176 pressed against the top side of the bracket 170 and 80 washer 178 held in place by a c-clip 180 fitted into a key way 182 of the angle bar 166. Once repositioned to the locking position shown in FIG. 17, the compression spring 174 will exert sufficient force between the canopy 22 and the truck bed 76 to hold the canopy 22 on the truck bed 76.

Looking to FIG. 18 it can be understood that when the angle bar 166 and the surface defining a void 168 through the bracket 170 are cylindrical in this region, once the cam handle is released to the position shown in FIG. 15 it may be rotated 180° around a vertical axis formed by the surface defining a void 168 so as to clear the truck bed top rail 140.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

What is claimed is:

1. A canopy support system for removing a canopy from and installing the canopy onto a truck, where the truck is on a surface and comprises a truck bed and the canopy defines first and second sides, the canopy support system comprising:
    a plurality of receivers supported by canopy;
    first and second lifting mechanisms, where each lifting mechanism comprises
        forward and rear legs, where at least one of the forward and rear legs defines an upper portion and a lower portion,
        a pivot supported by the forward and rear legs;
        a pivot assembly rotatably supported by the forward and rear legs, where the pivot assembly rotates about the pivot and comprises first and second projections adapted to engage the receivers supported by the canopy;
        an arm attached to the pivot;
        a gas strut connected between the arm and one of the front leg and the rear leg such that rotation of the pivot assembly between first and second orientations acts on the arm to compress the gas strut; and
        a lever arm mechanism comprising a handle movable between first and second positions, where the lever arm mechanism is mechanically connected between the upper portion and the lower portion such that, when the handle is moved between the first and second positions, the lever arm mechanism displaces the upper portion relative to the lower portion such that the pivot assembly moves between first and second distances, respectively, above the surface, where the first distance is lower than the second distance; wherein
    with the handles of the first and second lifting mechanisms in the first positions, the first and second lifting mechanisms are arranged such that the first and second projections of the pivot assembly of the first lifting assembly each engage one of the receivers supported by the first side of the canopy and the first and second projections of the pivot assembly of the second lifting assembly each engage one of the receivers supported by the second side of the canopy;
    with the pivot assembly of the first lifting assembly engaging the first side of the canopy, the handle of the lever arm mechanism of the first lifting assembly is displaced from the first position to the second position to lift the first side of the canopy off of the truck bed;
    with the pivot assembly of the second lifting assembly engaging the second side of the canopy, the handle of the lever arm mechanism of the second lifting assembly is displaced from the first position to the second position to lift the second side of the canopy off of the truck bed; and
    when the pivot assemblies are engaged with the canopy and are rotated between the first and second orientations, compression of the gas struts inhibits rotation of the canopy as the pivot assemblies rotate between the first and second orientations.

2. The canopy support system as recited in claim 1, wherein each of the first and second lifting mechanisms further comprises:
    a forward wheel supported by the forward leg;
    a rear wheel supported by the rear leg; wherein
    with the first and second sides of the canopy lifted off of the truck bed, the forward and rear wheels of the first and second lifting mechanisms allow the canopy to be displaced relative to the truck.

3. The canopy support system as recited in claim 1, wherein the lever arm mechanism further comprises:
    a tang supported by the upper portion of at least one of the forward and rear legs, where the handle is supported for movement relative to the tang at a tang pivot;
    a cam arm, where the cam arm is rotatably supported for movement relative to the handle at an armature pivot, and engages the lower portion of at least one of the forward and rear legs; wherein
    movement of the handle between the first and second positions causes pivoting movement of the handle about the tang pivot;
    pivoting movement of the handle about the tang pivot displaces the armature pivot relative to the upper portion of at least one of the forward and rear legs such that the lower portion of at least one of the forward and rear legs is displaced relative to the upper portion of at least one of the forward and rear legs; and lifts the canopy away from the truck bed.

4. A lift mechanism for lifting a canopy from a truck, where the truck is on a surface and comprises a truck bed and the canopy defines a side, the lift mechanism comprising:

a plurality of receivers;

forward and rear legs, where at least one of the forward and rear legs defines an upper portion and a lower portion, a pivot supported by the forward and rear legs;

a pivot assembly rotatably supported by the forward and rear legs, where the pivot assembly rotates about the pivot and comprises first and second projections adapted to engage the receivers supported by the canopy;

an arm attached to the pivot;

a gas strut connected between the arm and one of the front leg and the rear leg such that rotation of the pivot assembly between first and second orientations acts on the arm to compress the gas strut; and a lever arm mechanism comprising a handle movable between first and second positions, where the lever arm mechanism is mechanically connected between the upper portion and the lower portion such that, when the handle is moved between the first and second positions, the lever arm mechanism displaces the upper portion relative to the lower portion such that the pivot assembly moves between first and second distances, respectively, above the surface, where the first distance is lower than the second distance; wherein with the handle of the lifting assembly in the first position, the lifting assembly is arranged such that the first and second projections of the pivot assembly of the lifting assembly each engage one of the receivers supported by the side of the canopy;

with the handle of the lifting assembly in the first position and the pivot assembly of the lifting assembly engaging the side of the canopy, displacement of the handle of the lifting assembly from the first position to the second position lifts the side of the canopy off of the truck bed; and when the pivot assembly is engaged with the canopy and is rotated between the first and second orientations, compression of the gas strut inhibits rotation of the canopy as the pivot assembly rotates between the first and second orientations.

5. The lifting assembly as recited in claim 4, further comprising:

a forward wheel supported by the forward leg;

a rear wheel supported by the rear leg; wherein with the side of the canopy lifted off of the truck bed, the forward and rear wheels of the lift mechanism allows the canopy to be displaced relative to the truck.

6. The lifting assembly as recited in claim 4, wherein the lever arm mechanism further comprises:

a tang supported by the upper portion of at least one of the forward and rear legs, where the handle is supported for movement relative to the tang at a tang pivot;

a cam arm, where the cam arm is rotatably supported for movement relative to the handle at an armature pivot, and engages the lower portion of at least one of the forward and rear legs; wherein movement of the handle between the first and second positions causes pivoting movement of the handle about the tang pivot;

pivoting movement of the handle about the tang pivot displaces the armature pivot relative to the upper portion of at least one of the forward and rear legs such that the lower portion of at least one of the forward and rear legs is displaced relative to the upper portion of at least one of the forward and rear legs; and displacement of the lower portion of at least one of the forward and rear legs relative to the upper portion of at least one of the forward and rear legs lifts the canopy away from the truck bed.

* * * * *